(12) United States Patent
Nakamura (10) Patent No.: US 7,152,420 B2
(45) Date of Patent: Dec. 26, 2006

(54) AIR CONDITIONING SYSTEM

(75) Inventor: Hiroki Nakamura, Chiryu (JP)

(73) Assignee: Denso Corporation, Kariya (JP)

( * ) Notice: Subject to any disclaimer, the term of this patent is extended or adjusted under 35 U.S.C. 154(b) by 314 days.

(21) Appl. No.: 10/789,913

(22) Filed: Feb. 27, 2004

(65) Prior Publication Data
US 2004/0168452 A1    Sep. 2, 2004

(30) Foreign Application Priority Data
Feb. 28, 2003    (JP)    ............................. 2003-053713

(51) Int. Cl.
G05D 23/32    (2006.01)
F25B 1/00    (2006.01)
F25B 41/00    (2006.01)
F25B 49/00    (2006.01)

(52) U.S. Cl. ....................................... 62/228.4; 62/157

(58) Field of Classification Search ............... 62/228.4, 62/157, 231, 244
See application file for complete search history.

(56) References Cited

U.S. PATENT DOCUMENTS 6,470,697 B1    10/2002 Nakamura et al.
2001/0049943 A1*    12/2001 Nakamura et al. ......... 62/176.6

* cited by examiner

Primary Examiner—Chen Wen Jiang
(74) Attorney, Agent, or Firm—Harness, Dickey & Pierce, PLC

(57) ABSTRACT

An air conditioning system has a compressor that compresses a refrigerant and is capable of changing a flow rate of the refrigerant to be discharged, and an evaporator for evaporating the refrigerant to cool air. The evaporator is arranged in a casing that forms a passage to direct air into a vehicle cabin. When the refrigerant flow rate remains smaller than or equal to a predetermined flow rate substantially over a first predetermined time from when the refrigerant discharge flow rate falls to or below the predetermined flow rate, the compressor is operated so that the refrigerant discharge flow rate becomes greater than the predetermined flow rate at least over a second predetermined time that is shorter than the first predetermined time. In intermittent operation mode, the discharge flow rate is made greater than the predetermined flow rate for only a second elapsed predetermined time at every elapsed time.

12 Claims, 5 Drawing Sheets

AIR CONDITIONING SYSTEM

CROSS REFERENCE TO RELATED APPLICATIONS

This application is based upon, claims the benefit of priority of, and incorporates by reference Japanese Patent Application No. 2003-53713 filed Feb. 28, 2003.

BACKGROUND OF THE INVENTION

1. Field of the Invention

The present invention relates to an air conditioning system with a compressor that changes the flow rate of a refrigerant to be discharged, furthermore, the invention is applicable to an air conditioning system in which the compressor for the air conditioning system is driven by an electric motor.

2. Description of the Related Art

Conventional vehicle air conditioning systems have an intermittent operation mode in which the compressor is operated intermittently for the required operating time. While after-evaporator temperature is lower than or equal to wet-bulb temperature, intermittent operation mode is exercised after a lapse of a certain elapsed time since the compressor (engine) stops. On the other hand, when the after-evaporator temperature is higher than the wet-bulb temperature, the intermittent operation mode is stopped to prevent odor components that adhere to the surface of the evaporator from being scattered into the cabin (for example, see Japanese Patent Laid-Open Publication No. 2002-248933.

The invention described in Japanese Patent Laid-Open Publication No. 2002-248933 has the following problem if it is applied to an air conditioning system with a compressor, such as an electric compressor, that continuously controls the discharge flow rate of the refrigerant down to zero.

That is, in the invention described in Japanese Patent Laid-Open Publication No. 2002-248933, intermittent operation mode is exercised based on the instant when the compressor (engine) stops. Thus, even after the discharge flow rate of the refrigerant becomes approximately zero, intermittent operation mode will not be exercised while the compressor is in operation.

Consequently, even though many of the odor components adhering to the surface of the evaporator are being scattered into the cabin, intermittent operation mode will not be exercised. This causes the problem that many of the odor components adhering to the surface of the evaporator are blown into the cabin.

SUMMARY OF THE INVENTION

In view of the foregoing, it is a first object of the present invention to provide a new air conditioning system different from conventional systems. A second object of the present invention is to provide an air conditioning system with a compressor that can change the discharge flow rate of the refrigerant, so that many of the odor components adhering to the surface of the evaporator are prevented from being directed into the cabin.

To achieve the foregoing objects of the present invention, according to a first aspect of the present invention, an air conditioning system has: a compressor (231) which compresses a refrigerant and is capable of changing a flow rate of the refrigerant to be discharged. The system also has an evaporator (230) for evaporating the refrigerant to cool air, the evaporator being arranged in an air conditioning casing (210) that forms a passage to let air into an automobile cabin. Here, when the flow rate of the refrigerant discharged from the compressor (231) in operation remains smaller than or equal to a predetermined flow rate substantially over a first predetermined time (To) after the discharge flow rate of the refrigerant falls to or below the predetermined flow rate, the compressor (231) is operated so that the discharge flow rate of the refrigerant becomes greater than the predetermined flow rate at least over a second predetermined time that is shorter than the first predetermined time.

The refrigerant is thus passed through the evaporator (230) for a short time, which allows a reduction in the speed at which a surface wet ratio decreases, i.e., the speed at which the surface of the evaporator (230) dries. It is therefore possible to keep odor components covered with condensed water for a long time and prevent many of the odor components that adhere to the surface of the evaporator (230) from being blown into the cabin.

In addition, since the discharge flow rate of the refrigerant is raised after it has remained smaller than or equal to the predetermined flow rate substantially over the first predetermined time (To), it is possible to lower the operating ratio of the compressor (231). As described above, according to the present invention, it is possible to achieve fuel savings while preventing discomfort, ascribable to the odor components that adhere to the evaporator (230), from being felt by any passengers.

According to a second aspect of the present invention, an air conditioning system has a compressor (231) for compressing a refrigerant, the compressor being capable of changing the flow rate of the refrigerant to be discharged. The system also has an evaporator (230) for evaporating the refrigerant to cool air, the evaporator (230) being arranged in an air conditioning casing (210) for forming a passage to let air into a cabin. After the flow rate of the refrigerant discharged from the compressor (231) remains smaller than or equal to a predetermined flow rate substantially over a first predetermined time (To) after the discharge flow rate of the refrigerant falls to or below the predetermined flow rate, intermittent operation mode is performed at every first predetermined time (To). In the intermittent operation mode, the compressor (231) is operated so that the discharge flow rate of the refrigerant becomes greater than the predetermined flow rate over a second predetermined time that is shorter than the first predetermined time.

The refrigerant is thus passed through the evaporator (230) for a short time, which allows a reduction in the speed at which a surface wet ratio decreases, i.e., the speed at which the surface of the evaporator (230) dries. It is therefore possible to keep odor components covered with condensed water for a long time and prevent many of the odor components that adhere to the surface of the evaporator (230) from being passed into the cabin over a short time period. In addition, since the flow rate of the refrigerant to be discharged from the compressor (231) is made greater than the predetermined flow rate for the first predetermined time (To) after the discharge flow rate of the refrigerant falls to or below the predetermined flow rate, it is possible to lower the operating ratio of the compressor (231).

As described above, according to an embodiment of the present invention, it is possible to achieve fuel savings while preventing discomfort ascribable to the odor components adhering to the evaporator (230) from being felt by passengers.

According to a third aspect of the present invention, the total amount of discharge of the refrigerant during the second predetermined time is reduced according to an increase in the temperature of air introduced into the air conditioning casing (210). According to a fourth aspect of the present invention, the total amount of discharge of the refrigerant during the second predetermined time is reduced according to an increase in the humidity of air introduced into the air conditioning casing (210). According to a fifth aspect of the present invention, the total amount of discharge of the refrigerant during the second predetermined time is reduced according to a decrease in the rate of air flowing through the air conditioning casing (210). According to a sixth aspect of the present invention, when in inside air circulation mode for introducing cabin air into the air conditioning casing (210), the total amount of discharge of the refrigerant during the second predetermined time is made smaller than in outside air introduction mode for introducing outside air into the air conditioning casing (210). According to a seventh aspect of the present invention, when in inside air circulation mode for introducing cabin air into the air conditioning casing (210), the total amount of discharge of the refrigerant during the second predetermined time is reduced according to a decrease in the amount of insolation into the cabin.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

(First Embodiment)

Figure 1:
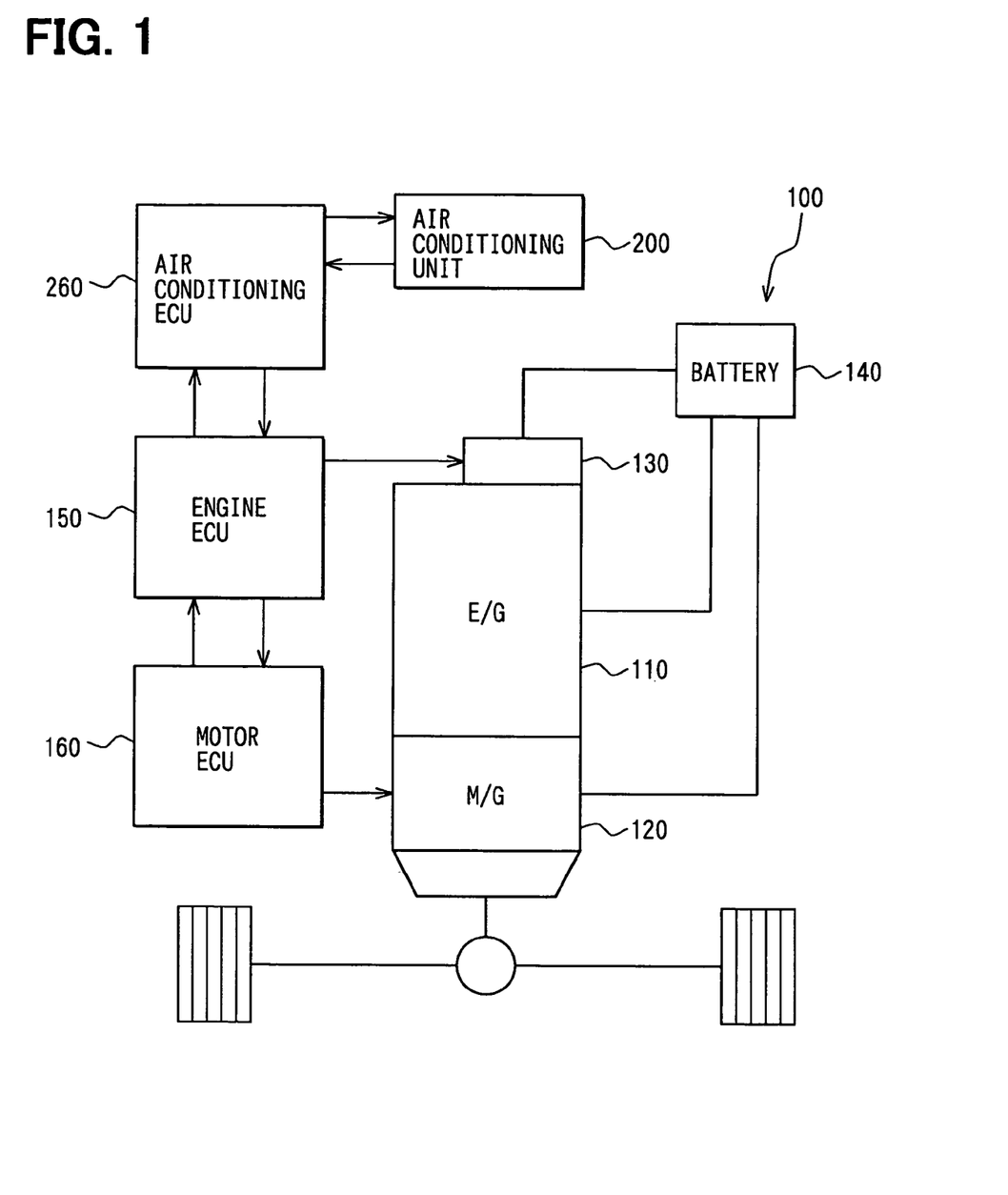
FIG. 1 is a schematic diagram of a hybrid vehicle to which an air conditioning system according to a first embodiment of the present invention is applied.

The present embodiment is a hybrid vehicle (hereinafter, referred to as "vehicle") 100 to which a vehicle air conditioning system according to the present invention is applied. FIG. 1 shows the general configuration of the vehicle 100.

The vehicle 100 includes an engine (internal combustion engine) 110, a motor (motor generator) 120, engine control equipment 130, a battery (secondary cells) 140, an engine electronic control unit (EECU) 150, a motor electronic control unit (MECU) 160, an air conditioning system 200, and an air conditioning system electric control unit (AECU) 260. The motor 120 has both the function of a motor, or a driving source, and the function of a generator. The engine control equipment 130 consists of a starter motor for starting the engine 110, an ignition system, a fuel injection system, etc. The battery 140 supplies electric power to the motor 120 and the engine control equipment 130. The EECU 150 controls the engine control equipment 130. The MECU 160 controls the motor 120 in cooperation with the EECU 150.

In the present embodiment, the engine 110 and the motor 120 are controlled based on various vehicle information including the running state of the vehicle and the charge condition of the battery 140. Specifically, possible situations include: running on the power of the engine 110; running on the power of the motor 120; running on the power of both the engine and the motor 110 and 120; and running with the generation (regenerative braking) of the motor 120.

Figure 2:
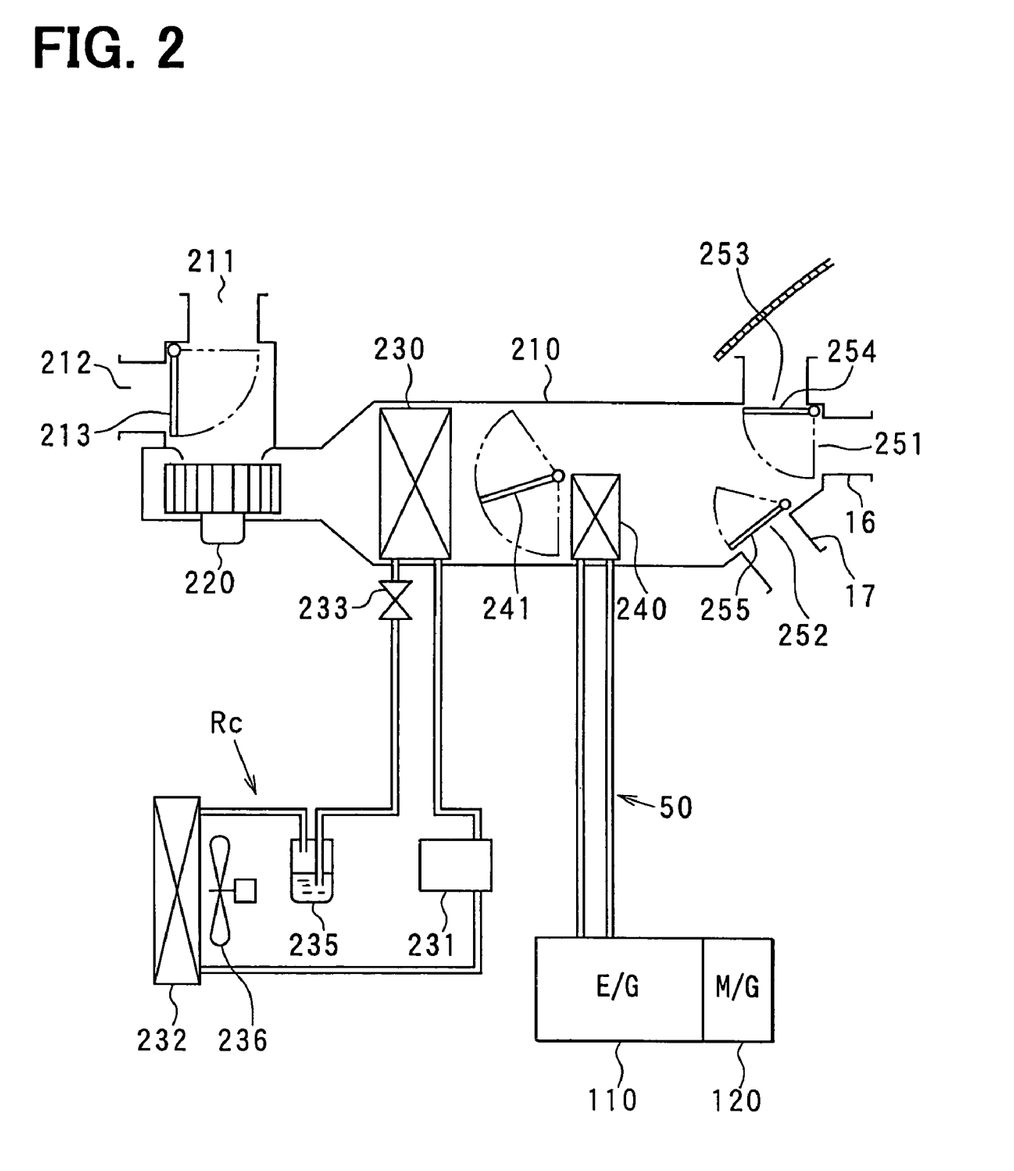
FIG. 2 is a schematic diagram showing the air conditioning system according to the first embodiment of the present invention.

FIG. 2 is a schematic diagram showing the air conditioning system 200. An air conditioning casing 210 is a duct means made of resin (for example, polypropylene), and forms the passage to let air into the cabin (hereinafter, referred to as air-conditioned air).

An outside air inlet 211 and an inside air inlet 212 are arranged at the uppermost side of the flow of the air-conditioned air in this air conditioning casing 210. The outside air inlet 211 introduces air from outside the cabin into the air conditioning casing 210. The inside air inlet 212 introduces air from inside the cabin into the air conditioning casing 210. Both the inlets 211 and 212 are controlled to open and close by an inside/outside air switching door 213.

A fan 220 is a centrifugal type blowing means for moving air. An evaporator 230 is a cooler for cooling the air-conditioned air. A heater core 240 is arranged at the downstream side of the air-conditioned air of this evaporator 230. The heater 240 heats the air-conditioned air with the coolant of the engine 110 as the heat source.

An air mix door 241 is a cool/warm air mixing ratio control means for adjusting the rate of the air passing through the heater core 240 and the rate of the air circumventing the heater core 240 out of the air-conditioned air (cool air) past the evaporator 230, thereby adjusting the temperature of the air let into the cabin.

A face opening 251 is an opening for expelling the air-conditioned air after it is adjusted in temperature by the air mix door 241. The air is generally directed toward passenger heads. A foot opening 252 is an opening for letting out and directing the temperature-adjusted air-conditioned air toward passenger feet. A defroster opening 253 is an opening for letting out and directing the temperature-adjusted air-conditioned air toward the windshield.

A first outlet mode door 254 is a first outlet mode switching means for opening and closing the face opening 251 and the defroster opening 253. A second outlet mode door 255 is a second outlet mode switching means for opening and closing the foot opening 252. Two outlet mode doors 254, 255 can be controlled to exercise such outlet modes as a face mode, a foot mode, and a defroster mode.

In face mode, the air-conditioned air is expelled toward passenger heads. In foot mode, the air-conditioned air is expelled toward passenger feet. In defroster mode, the air-conditioned air is expelled toward the windshield.

The evaporator 230 is a heat exchanger on the low pressure side of a vapor compression type refrigerator Rc which exhibits refrigeration power through refrigerant evaporation. The vapor compression type refrigerator, as is well known, includes a compressor 231, a condenser (radiator) 232, a decompressor 233, and the evaporator 230. The compressor 231 compresses the refrigerant. The condenser 232 cools (condenses) the refrigerant through heat exchange between the refrigerant compressed by the compressor 231 and air. The decompressor 233 decompresses the refrigerant cooled by the condenser 232.

In the present embodiment, the compressor 231 operates on the driving power from a driving source dedicated to the compressor, such as an electric motor. It is therefore possible to continuously change the discharge flow rate of the refrigerant from zero, or from the state where the compressor 231 is at rest, to a maximum discharge flow rate of the refrigerant regardless of whether or not the engine 110 is in operation. A receiver 235 is a vapor-liquid separator for separating the refrigerant flowing in from the condenser 232 into a gas phase and a liquid phase, and storing a surplus of the refrigerant. A fan 236 is blowing means for sending cooling air to the condenser 232. Air conditioning devices as the inside/outside air switching door 213, the fan 220, the condenser fan 236, the air mix door 241, and the outlet mode doors 254 and 255 are controlled by the AECU 260 (see FIG. 1).

Figure 3:
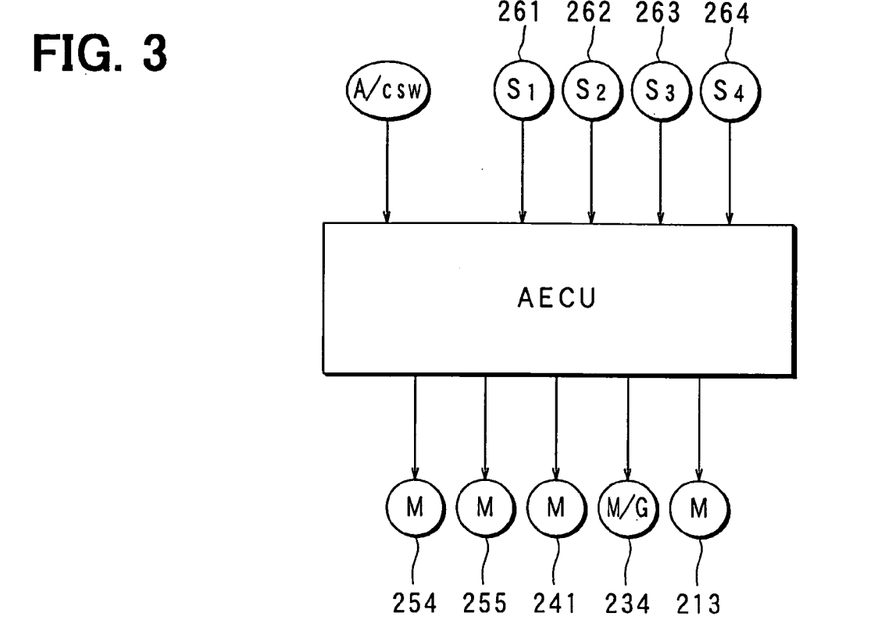
FIG. 3 is a schematic diagram showing a control system of the air conditioning system according to the first embodiment of the present invention.

As shown in FIG. 3, the AECU 260 receives signals from air conditioning sensors including: a room temperature sensor (room temperature detecting means) 261 for detecting the temperature of the air inside the cabin; an outside temperature sensor (outside temperature detecting means) 262 for detecting the temperature of the air outside the cabin; an after-evaporator sensor (temperature detecting means) 263 for detecting the temperature of the air-conditioned air at the position immediately after the evaporator 230; and a humidity sensor (humidity detecting means) 264 for detecting the relative humidity of the air inside the cabin.

Figure 4:
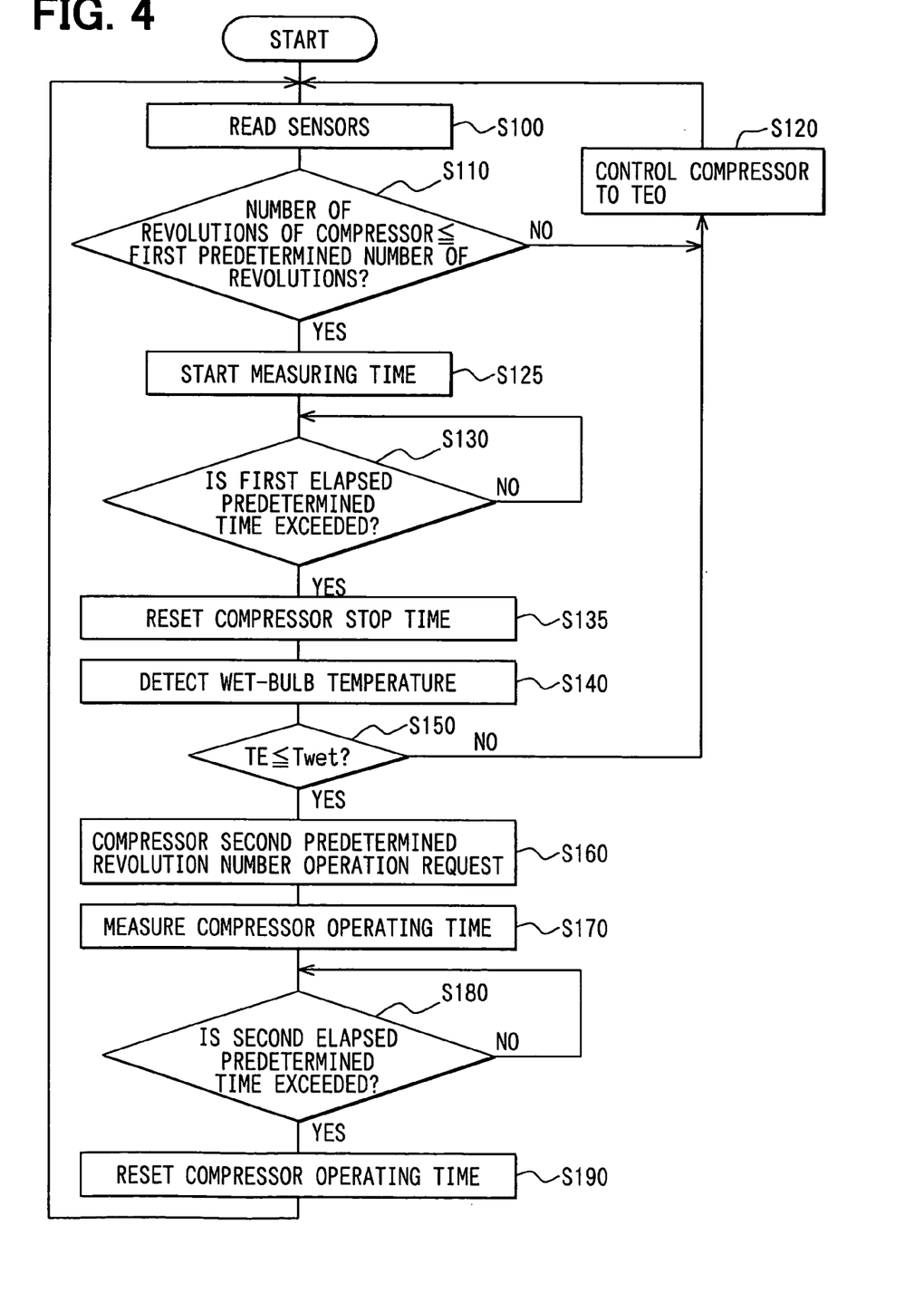
FIG. 4 is a flow chart of the air conditioning system according to the first embodiment of the present invention.

Characteristic operations of the present embodiment (AECU 260) will be described below with reference to the flowchart shown in FIG. 4. When a starter switch (A/C switch) of the air conditioning system is turned on, detected values are read from the various air conditioning sensors 261–264 (S100). Meanwhile, the fan 220 and the compressor 231 are operated if necessary. Then, determination is made as to if the number of revolutions of the compressor 231 is lower than or equal to a first predetermined number of revolutions, i.e., if the flow rate of the refrigerant discharged from the compressor 231 is lower than or equal to a predetermined flow rate. If the number of revolutions of the compressor 231 is higher than the first predetermined number of revolutions, the compressor 231 is controlled with respect to the number of revolutions so that the temperature detected by the after-evaporator sensor 263 (hereinafter, referred to as after-evaporator temperature TE) comes to a target after-evaporator temperature TEO (S120).

Incidentally, in the present embodiment, the target after-evaporator temperature TEO is provided with a 1° C. hysteresis. Specifically, if Yes at S110, a hysteresis of 3° C.–4° C. is assumed. If No at S150, to be described later, a hysteresis of 25° C.–26° C. is assumed.

Alternatively, if the number of revolutions of the compressor 231 is lower than or equal to the first predetermined number, elapsed time (hereinafter, referred to as compressor stop time) is measured based on the instant when the compressor 231 falls to or below the first predetermined number of revolutions, i.e., the instant when the discharge flow rate of the refrigerant falls to or below the predetermined flow rate. Then, a determination is made regarding the discharge flow rate, that is, if the discharge flow rate of the refrigerant remains lower than or equal to the predetermined flow rate substantially beyond a first predetermined time (hereinafter, referred to as first elapsed predetermined time To) (S130). If the elapsed time exceeds the first elapsed predetermined time To, the measurement of the compressor stop time is reset (S135) before the wet-bulb temperature Twet of the evaporator 230 is detected (S140).

Incidentally, "the discharge flow rate of the refrigerant remains lower than or equal to the predetermined flow rate substantially beyond the first elapsed predetermined time To" covers not only the case where the discharge flow rate of the refrigerant is always lower than or equal to the predetermined flow rate from when it falls to or below the predetermined flow rate, but also the case where the discharge flow rate of the refrigerant exceeds the predetermined flow rate instantaneously. In the present embodiment, the discharge flow rate of the refrigerant is considered as remaining lower than or equal to the predetermined flow rate substantially beyond the first elapsed predetermined time To if the average discharge flow rate of the refrigerant remains lower than or equal to the predetermined flow rate beyond the first elapsed predetermined time To.

Incidentally, in the present embodiment, the first elapsed predetermined time To is approximately 30 seconds. A second elapsed predetermined time Ts to be described later is approximately 1 second. The first elapsed predetermined time To and the second elapsed predetermined time Ts depend on the size (surface area) of the evaporator 230 and the temperature of the air flowing into the evaporator 230.

The wet-bulb temperature Twet refers to the surface temperature of the evaporator 230 when the surface of the evaporator 230 is wet with condensed water. While the surface of the evaporator 230 is wet with condensed water, the after-evaporator temperature Te will not exceed the wet-bulb temperature Twet.

Incidentally, the wet-bulb temperature Twet is determined by the temperature (dry-bulb temperature) and humidity (relative humidity) of the air flowing into the evaporator 230 (intake air). In the present embodiment, when in inside air circulation mode for introducing inside air, the wet-bulb temperature Twet is calculated based on the detected values of the room temperature sensor 261 and the humidity sensor 264 and the moist air chart shown in FIG. 5 which is stored in a ROM (read-only memory) in advance. When in outside air introduction mode for introducing outside air, the after-evaporator temperature TE, after a lapse of a predetermined time (in the present embodiment, 30 seconds) from when the discharge flow rate of the refrigerant falls to or below the predetermined flow rate, is used as the wet-bulb temperature Twet.

Figure 5:
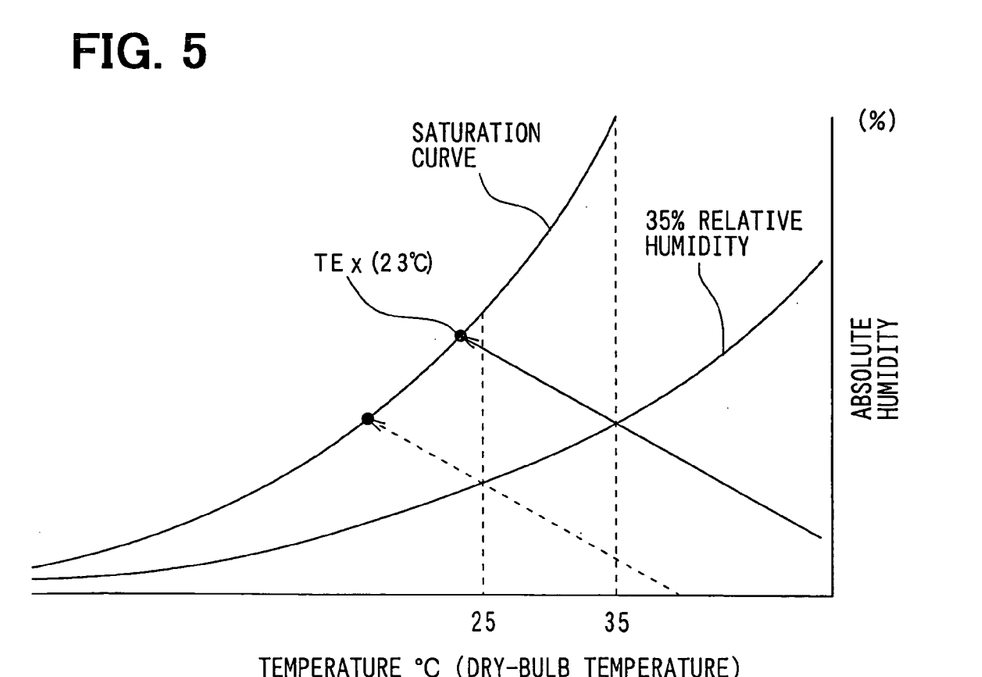
FIG. 5 is a moist air chart.

For example, take the case of the wet-bulb temperature Twet based on FIG. 5. When the air flowing into the evaporator 230 (intake air) has a temperature (dry-bulb temperature) equal to 35° C. and a relative humidity equal to 35%. An isenthalpic line passing through the intersection P therebetween and the saturation curve form an intersection TEX, and the wet-bulb temperature Twet is calculated as the temperature TEX equal to 23° C. corresponding to the intersection TEx.

Then, the wet-bulb temperature Twet and the after-evaporator temperature TE are compared (S150). If the after-evaporator temperature TE is lower than or equal to the wet-bulb temperature Twet, the AECU 260 generates a second revolution number operation request for operating the compressor 231 in a second predetermined number of revolutions that is determined in advance so that the discharge flow rate of the refrigerant becomes greater than the predetermined flow rate (S160).

Then, compressor operating time is measured based on the instant when the second revolution number operation request is issued (S170). Whether or not the operating time exceeds a second predetermined time (hereinafter, this predetermined time will be referred to as a second elapsed predetermined time Ts) is determined (S180), and if the operating time exceeds the second elapsed predetermined time Ts, the compressor operating time is reset before the processing returns to S100 (S190). On the other hand, if the after-evaporator temperature TE is higher than the wet-bulb temperature Twet, the processing moves to S120.

Next, description of the operation and effect of the present embodiment will be discussed. While the after-evaporator temperature TE is lower than or equal to the wet-bulb temperature Twet, the discharge flow rate of the refrigerant is kept lower than or equal to the predetermined flow rate until the compressor stop time reaches the first elapsed predetermined time To from when the discharge flow rate of the refrigerant falls to or below the predetermined flow rate. Then, intermittent operation mode is exercised to operate the compressor 231 so that the discharge flow rate of the refrigerant becomes greater than the predetermined flow rate over the second elapsed predetermined time Ts. On the other hand, when the after-evaporator temperature TE is higher than the wet-bulb temperature Twet, intermittent operation mode is stopped. Since the refrigerant is passed through the evaporator 230 for a short time, it is possible to reduce the speed at which the surface wet ratio decreases, i.e., the speed at which the surface of the evaporator 230 dries.

Since odor components can be kept covered with condensed water for a long time, it is possible to prevent many of the odor components adhering to the surface of the evaporator 230 from being blown into the cabin in a short time. Moreover, after the discharge flow rate of the refrigerant falls to or below the predetermined flow rate, the discharge flow rate of the refrigerant is made greater than the predetermined flow rate for only the second elapsed predetermined time Ts intermittently at every first elapsed predetermined time To. This can prevent an increase in the operating ratio of the compressor 231.

Figure 6A:
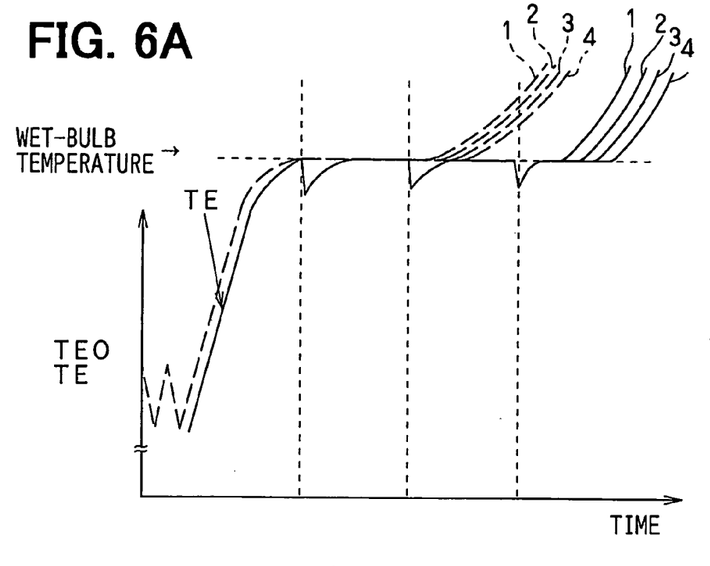
FIG. 6A is a graph of the relationship between after-evaporator temperature TE and time.

As described above, according to the present embodiment, it is possible to achieve vehicle fuel savings while preventing a feeling of passenger discomfort ascribable to the odor components that adhere to the evaporator 230. The thick full lines in FIG. 6A show the behavior of the after-evaporator temperature TE in the air conditioning system according to the present embodiment. The thick broken lines in FIG. 6A show the behavior of the after-evaporator temperature TE without intermittent operation mode. The reference numerals (1) to (4) represent measuring points of the after-evaporator temperature TE (see FIG. 6E).

Figure 6B:
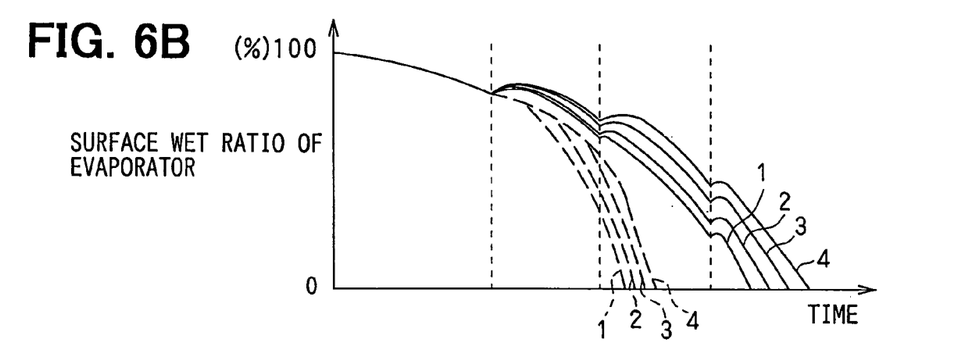
FIG. 6B is a graph showing the relationship between the surface wet ratio of the evaporator and time.
Figure 6C:
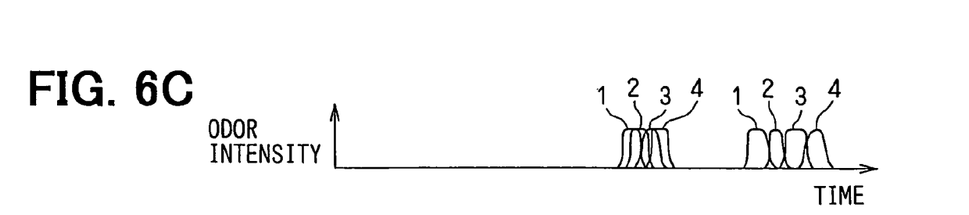
FIG. 6C is a graph showing the relationship between odor intensities and time.
Figure 6D:
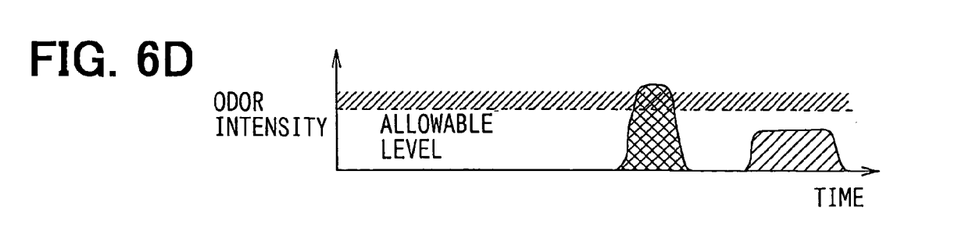
FIG. 6D is a graph showing the four types of odor intensities shown in FIG. 6C synthetically.
Figure 6E:
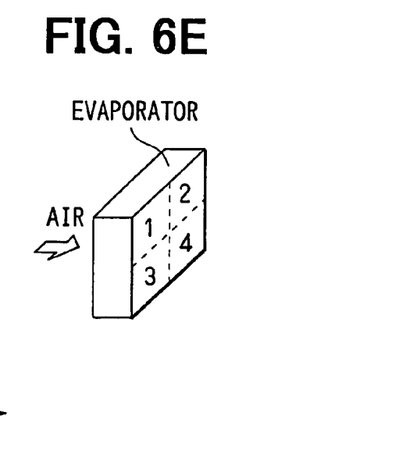
FIG. 6E is a schematic diagram showing the measuring points of the curves (1) to (4) shown in FIGS. 6A to 6C.

Moreover, the thick full lines in FIG. 6B show the behavior of the surface wet ratio of the evaporator 230 in the air conditioning system according to the present embodiment. The thick broken lines in FIG. 6B show the behavior of the surface wet ratio of the evaporator 230 without intermittent operation mode. As is evident from the graphs of FIGS. 6A and 6B, the speed at which the surface wet ratio of the evaporator 230 falls, i.e., the speed at which the surface of the evaporator 230 dries is made smaller. This proves that many of the odor components adhering to the surface of the evaporator 230 can be prevented from being scattered into the cabin, making it possible to suppress odor intensities to or below an allowable level as shown in FIG. 6C. FIG. 6D is a graph showing the curves (1) to (4) of FIG. 6C synthetically.

When the after-evaporator temperature TE is higher than the wet-bulb temperature Twet, the odor components have been scattered completely and no more odor component will be scattered as shown in FIG. 6C. Thus, as in the present embodiment, intermittent operation mode can be stopped when the after-evaporator temperature TE is higher than the wet-bulb temperature Twet, so that the operating ratio of the compressor 231 is reduced further for the sake of "fuel savings."

Incidentally, the present invention shall not preclude any (nonintermittent) operation mode for operating the compressor 231 in lower revolutions during the first elapsed predetermined time To.

(Second Embodiment)

In the foregoing embodiment, the second elapsed predetermined time is constant. In the present embodiment, the total amount of discharge of the refrigerant during the second predetermined time is changed according to the temperature of the air introduced into the air conditioning casing 210, so that the total amount of discharge of the refrigerant during the second predetermined time decreases with an increase in the temperature of the air introduced.

In general, introduced air has a generally constant relative humidity irrespective of the air temperature. When the air temperature rises, however, the introduced air increases in absolute humidity since the relative humidity is generally constant. Consequently, the higher the temperature of the introduced air is, the slower the speed at which the surface wet ratio of the evaporator 230 decreases, i.e., the speed at which the surface of the evaporator 230 dries. The total amount of discharge of the refrigerant during the second predetermined time is thus reduced according to the increase in the temperature of the introduced air, so that the operating ratio of the compressor 231 can be lowered for further "fuel savings."

(Third Embodiment)

In the first embodiment, the second elapsed predetermined time is constant. In the present embodiment, the total amount of discharge of the refrigerant during the second predetermined time is reduced according to an increase in the humidity of the introduced air.

(Fourth Embodiment)

In the first embodiment, the second elapsed predetermined time is constant. In the present embodiment, the total amount of discharge of the refrigerant during the second predetermined time is reduced according to a decrease in the rate of air flowing through the air conditioning casing 210 (the voltage applied to the fan 220).

(Fifth Embodiment)

In the first embodiment, the second elapsed predetermined time is constant. In the present embodiment, the total amount of discharge of the refrigerant during the second predetermined time is made smaller in inside air circulation mode for introducing inside air into the air conditioning casing 210 than in outside air introduction mode for introducing outside air into the air conditioning casing 210. The reason for this is that the relative humidity and absolute humidity of the introduced air are typically higher in inside air circulation mode than in outside air introduction mode because of water vapor emitted by passengers. Here, the speed at which the surface wet ratio of the evaporator 230 decreases, i.e., the speed at which the surface of the evaporator 230 dries is slower in inside air circulation mode than in outside air introduction mode.

(Sixth Embodiment)

In the first embodiment, the second elapsed predetermined time is constant. In the present embodiment, the total amount of discharge of the refrigerant during the second predetermined time is increased according to an increase in vehicle speed when in outside air introduction mode.

The reason for this is that when in outside air introduction mode, the increasing vehicle speed entails a rise in ram pressure, causing a substantial increase in the rate of the air flowing through the air conditioning casing 210. The total amount of discharge of the refrigerant during the second predetermined time is thus increased according to the increase in vehicle speed, so as to suppress an increase in the speed at which the surface wet ratio of the evaporator 230 decreases, i.e., the speed at which the surface of the evaporator 230 dries.

(Seventh Embodiment)

In the first embodiment, the second elapsed predetermined time is constant. In the present embodiment, an insolation sensor (insolation amount detecting means) for detecting the amount of insolation into the cabin is provided, and the total amount of discharge of the refrigerant during the second predetermined time is increased according to a decrease in the amount of insolation when in inside air circulation mode.

The reason for this is that the decrease in the amount of insolation lowers the room temperature. Here, the relative humidity inside the cabin rises to lower the speed at which the surface wet ratio of the evaporator 230 decreases, i.e., the speed at which the surface of the evaporator 230 dries.

(Other Embodiments)

The present invention provides an air conditioning system possessing: a compressor for compressing a refrigerant, the compressor being capable of changing the flow rate of the refrigerant to be discharged; an evaporator for evaporating the refrigerant to cool air, the evaporator being arranged in an air conditioning casing that forms a passage to let air into a cabin; first clocking means for measuring time from an instant when the flow rate of the refrigerant discharged from the compressor falls to or below a predetermined flow rate; and second clocking means for measuring time from an instant when the flow rate of the refrigerant discharged from the compressor falls to or below the predetermined flow rate. The air conditioning system is characterized in that when the time measured by the first clocking means substantially reaches a first predetermined time from when the flow rate of the refrigerant discharged from the compressor falls to or below the predetermined flow rate, the compressor is operated so that the flow rate of the refrigerant discharged from the compressor becomes greater than the predetermined flow rate until the time measured by the second clocking means exceeds a second predetermined time that is shorter than the first predetermined time. Thus, the air conditioning system is not limited to the embodiments described above.

The present invention also provides a vehicle air conditioning system possessing: a compressor for compressing a refrigerant, the compressor being capable of changing the flow rate of the refrigerant to be discharged; an evaporator for evaporating the refrigerant to cool air, the evaporator being arranged in an air conditioning casing that forms a passage to let air into a cabin; a first clocking means for measuring time from an instant when the flow rate of the refrigerant discharged from the compressor falls to or below a predetermined flow rate; and a second clocking means for measuring time from an instant when the flow rate of the refrigerant discharged from the compressor falls to or below a predetermined flow rate.

The vehicle air conditioning system is characterized such that: when the flow rate of the refrigerant discharged from the compressor falls to or below the predetermined flow rate, the discharge flow rate of the refrigerant is kept lower than or equal to the predetermined flow rate until the time measured by the first clocking means reaches a first predetermined time. An intermittent operation mode is then exercised until the time measured by the second clocking means exceeds a second predetermined time shorter than the first predetermined time. In intermittent operation mode, the compressor is operated so that the discharge flow rate of the refrigerant becomes greater than the predetermined flow rate. Thus, the vehicle air conditioning system is not limited to the embodiments described above.

Moreover, the present invention is not limited to each individual embodiment described above but may combine any of the second to seventh embodiments. In the foregoing embodiments, the wet-bulb temperature Twet, when in inside air circulation mode, is calculated based on the detected values of the room temperature sensor 261 and the humidity sensor 264 and the moist air chart. In outside air introduction mode, the after-evaporator temperature TE after a lapse of a predetermined time (in the embodiments, 30 seconds) since the compressor 231 (engine 110) stops is used as the wet-bulb temperature Twet. However, the present invention is not limited as such. The wet-bulb temperature Twet may be detected by other means.

For example, the wet-bulb temperature Twet may be determined based on the temperature of the introduced air regardless of whether in outside air introduction mode or in inside air circulation mode. Alternatively, the lower of the after-evaporator temperature TE and the temperature detected by the outside air sensor 262 immediately after the stop of the compressor 231 (engine 110) may be used as the wet-bulb temperature Twet.

In the foregoing embodiments, the first elapsed predetermined time To is set at approximately 30 seconds. However, the present invention is not limited thereto. For example, To may be set between 20 seconds and 90 seconds, or preferably 20 seconds and 60 seconds.

In the foregoing embodiments, the second elapsed predetermined time Ts is set at approximately 1 second. However, the present invention is not limited thereto. For example, Ts may be set between 0.5 seconds and 5 seconds, or preferably 0.5 seconds and 2 seconds.

In the foregoing embodiments, the compressor 231 is driven by a dedicated driving source. However, the present invention is not limited thereto. For example, the compressor 231 may be driven by the engine 110. Here, intermittent operation mode may be stopped when the engine 110 is at rest. Incidentally, in order to drive the compressor 231 independent of the engine 110, the compressor 231 must be a variable displacement type compressor.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An air conditioning system comprising:
a compressor that compresses a refrigerant and is capable of changing a flow rate of the refrigerant to be discharged; and
an evaporator for evaporating the refrigerant to cool air, the evaporator arranged in a casing that forms a passage to direct air into a vehicle cabin, wherein
when the refrigerant flow rate discharged from the compressor in operation remains smaller than or equal to a predetermined flow rate, but greater than zero, over a first predetermined time, the compressor is operated so that the refrigerant discharge flow rate becomes greater than the predetermined flow rate at least over a second predetermined time that is shorter than the first predetermined time.

2. The air conditioning system according to claim 1, wherein the total amount of refrigerant discharge during the second predetermined time is reduced according to an increase in the temperature of air introduced into the air conditioning casing.

3. The air conditioning system according to claim 1, wherein the total amount of refrigerant discharge during the second predetermined time is reduced according to an increase in the humidity of air introduced into the air conditioning casing.

4. The air conditioning system according to claim 1, wherein the total amount of refrigerant discharge during the second predetermined time is reduced according to a decrease in the rate of air flowing through the air conditioning casing.

5. The air conditioning system according to claim 1, wherein when in inside air circulation mode for introducing cabin air into the air conditioning casing, the total amount of refrigerant discharge during the second predetermined time is made smaller than in outside air introduction mode for introducing outside air into the air conditioning casing.

6. The air conditioning system according to claim 1, wherein when in inside air circulation mode for introducing cabin air into the air conditioning casing, the total amount of refrigerant discharge during the second predetermined time is reduced according to a decrease in the amount of insolation into the cabin.

7. An air conditioning system comprising:
a compressor for compressing a refrigerant, the compressor being capable of changing a refrigerant discharge flow rate; and
an evaporator for evaporating the refrigerant to cool air, the evaporator being arranged in an air conditioning casing that forms a passage of air to discharge into a cabin, wherein
after the flow rate of the refrigerant discharged from the compressor remains smaller than or equal to a predetermined flow rate, but greater than zero, over a first predetermined time, intermittent operation mode is performed at every first predetermined time, in the intermittent operation mode the compressor operates so that the discharge flow rate of the refrigerant becomes greater than the predetermined flow rate over a second predetermined time that is shorter than the first predetermined time.

8. The air conditioning system according to claim 7, wherein the total amount of refrigerant discharge during the second predetermined time is reduced according to an increase in the temperature of air introduced into the air conditioning casing.

9. The air conditioning system according to claim 7, wherein the total amount of refrigerant discharge during the second predetermined time is reduced according to an increase in the humidity of air introduced into the air conditioning casing.

10. The air conditioning system according to claim 7, wherein the total amount of refrigerant discharge during the second predetermined time is reduced according to a decrease in the rate of air flowing through the air conditioning casing.

11. The air conditioning system according to claim 7, wherein when in inside air circulation mode for introducing cabin air into the air conditioning casing, the total amount of refrigerant discharge during the second predetermined time is made smaller than in outside air introduction mode for introducing outside air into the air conditioning casing.

12. The air conditioning system according to claim 7, wherein when in inside air circulation mode for introducing cabin air into the air conditioning casing, the total amount of refrigerant discharge during the second predetermined time is reduced according to a decrease in the amount of insolation into the cabin.

* * * * *